(12) United States Patent
Yuuki et al.

(10) Patent No.: US 6,219,116 B1
(45) Date of Patent: Apr. 17, 2001

(54) LIQUID CRYSTAL PANEL DEVICE HAVING A LIGHT GUIDE PLATE WITH L SHAPED RIBS

(75) Inventors: Akimasa Yuuki; Mitsumasa Umesaki; Sadayuki Matsumoto; Tomohiro Sasagawa; Sin Kawabe, all of Tokyo; Kazutoshi Shimojo, Kumamoto, all of (JP)

(73) Assignees: Mitsubishi Denki Kabushiki Kaisha, Tokyo; Advanced Display Inc., Kumamoto, both of (JP)

( * ) Notice: Subject to any disclaimer, the term of this patent is extended or adjusted under 35 U.S.C. 154(b) by 0 days.

(21) Appl. No.: 09/162,439

(22) Filed: Sep. 29, 1998

(30) Foreign Application Priority Data

Sep. 29, 1997 (JP) .................................................. 9-264024

(51) Int. Cl.[7] ........................ G02F 1/1333; G02F 1/1335
(52) U.S. Cl. .................................................. 349/58; 349/65
(58) Field of Search .................................. 349/58, 62, 65

(56) References Cited

U.S. PATENT DOCUMENTS

| | | | |
|---|---|---|---|
| 5,134,505 | * 7/1992 | Tanaka et al. | 359/48 |
| 5,486,942 | * 1/1996 | Ichikawa et al. | 359/83 |
| 5,548,430 | * 8/1996 | Kuo | 359/80 |
| 5,550,657 | * 8/1996 | Tanaka et al. | 359/49 |
| 5,654,779 | * 8/1997 | Nakayama et al. | 349/58 |
| 5,694,190 | * 12/1997 | Matsumoto et al. | 349/151 |
| 5,739,879 | * 4/1998 | Tsai | 349/62 |

FOREIGN PATENT DOCUMENTS

| | | |
|---|---|---|
| 6174935 | 6/1994 | (JP) . |
| 7294921 | 11/1995 | (JP) . |
| 862430 | 3/1996 | (JP) . |

* cited by examiner

*Primary Examiner*—Walter J. Malinowski
(74) *Attorney, Agent, or Firm*—Leydig, Voit & Mayer, Ltd.

(57) ABSTRACT

A liquid crystal panel module includes a liquid crystal panel unit on a backlight unit. The backlight unit preferably has a holding member for holding the liquid crystal panel unit in a specific position on the backlight unit with no gap therebetween. Preferably, the backlight unit comprises a light guide; a lamp for emitting illumination from one side of the light guide; and a reflector for collecting light from the lamp on the light guide. The reflector has a polygonal cross section, a thickness greater than the thickness of the light guide, and is open to only the thickness of the light guide on the light guide side of the reflector.

6 Claims, 11 Drawing Sheets

Off-set X between center points A and B (mm)

Fig.14 PRIOR ART

LIQUID CRYSTAL PANEL DEVICE HAVING A LIGHT GUIDE PLATE WITH L SHAPED RIBS

BACKGROUND OF THE INVENTION

1. Field of the Invention

The present invention relates to a liquid crystal panel module, and to a liquid crystal display device using the liquid crystal panel module.

2. Description of the Related Art

Most notebook computers and dedicated laptop wordprocessors available today use a liquid crystal display (LCD) device mounted on the inside of a cover for a monitor. Such LCDs typically comprise a transparent liquid crystal panel, a light guide for guiding illumination light to the LC panel, a lamp disposed to one side of the light guide, and a reinforced plastic or metal frame in which these and other components are housed.

In the market for notebook computers in particular, however, demand remains great for ever smaller, lighter, and thinner systems. This has driven demand for thinner LCD devices.

Figure 9:
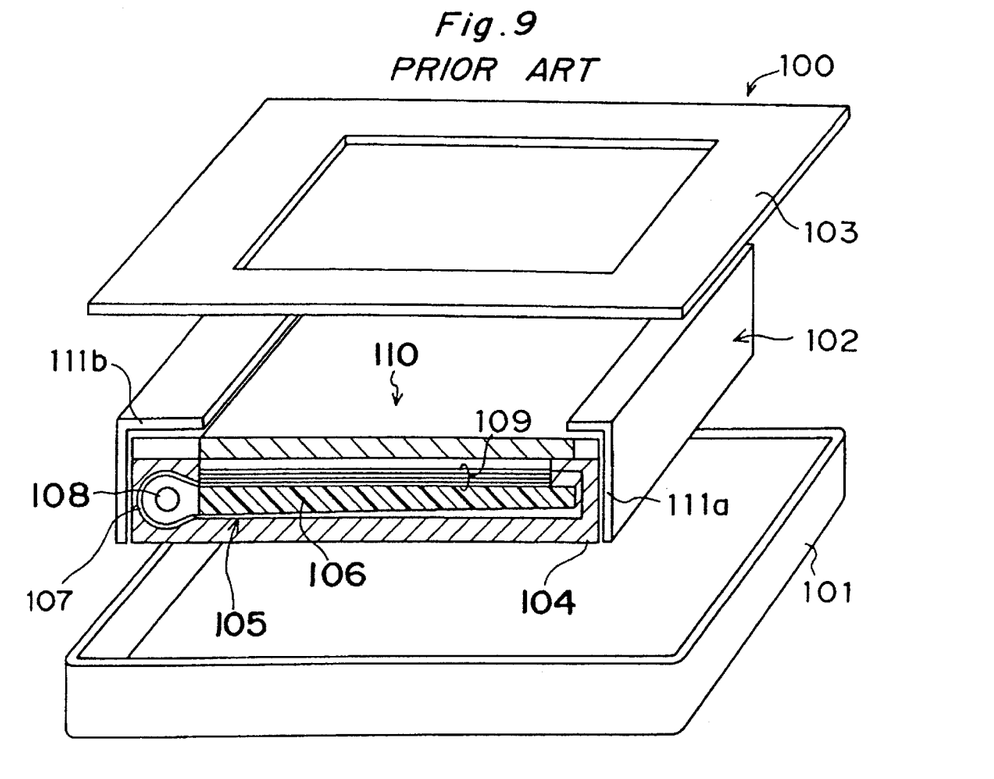
FIG. 9 is a partially exploded perspective view of a conventional LCD device.

FIG. 9 is a sectional view of a conventional LCD device 100 such as is commonly used in notebook computers. As will be known from the figure, this LCD device 100 has a liquid crystal panel module 102 disposed in a frame 101 with a mask frame 103 affixed to the top.

The liquid crystal panel module 102 comprises, assembled in sequence on a plastic frame 104, a backlight unit 105, stacked films 109 comprising an optical diffusion sheet and a lens sheet, and TFT LC panel unit 110.

The backlight unit 105 comprises a light guide 106 with a reflective sheet affixed to the bottom side thereof as seen in FIG. 9, a reflector 107 with a circular cross section, and a lamp 108.

Metal chassis 11a and 111b for securing the liquid crystal panel module 102 to the frame 101 are provided at the left and right sides of the panel module 102.

Note that U.S. Pat. No. 5,504,605, for example, teaches the construction of a liquid crystal module using a plastic frame.

With a liquid crystal panel module 102 as described above and shown in FIG. 9, there are three major factors limiting the reduction in module thickness. These are described below.

Figure 10:
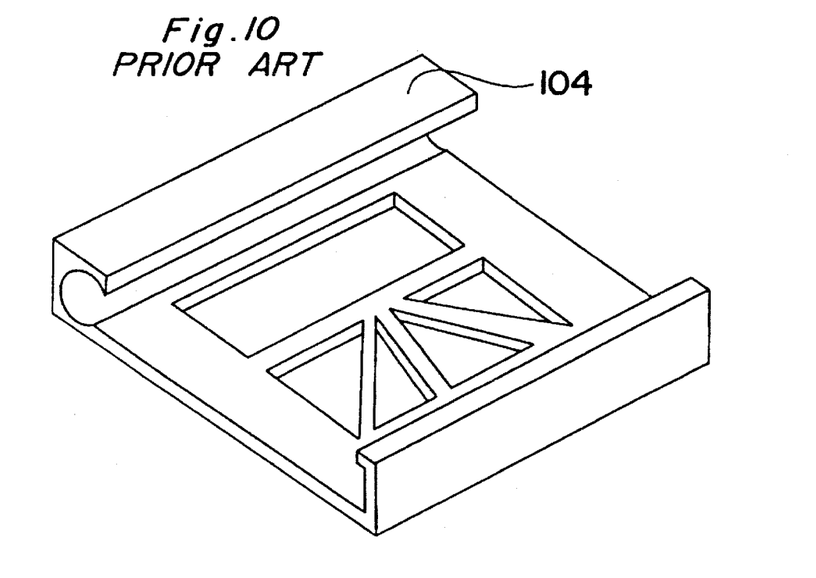
FIG. 10 is a perspective view of the plastic frame used in the LCD device shown in FIG. 9.
Figure 11:
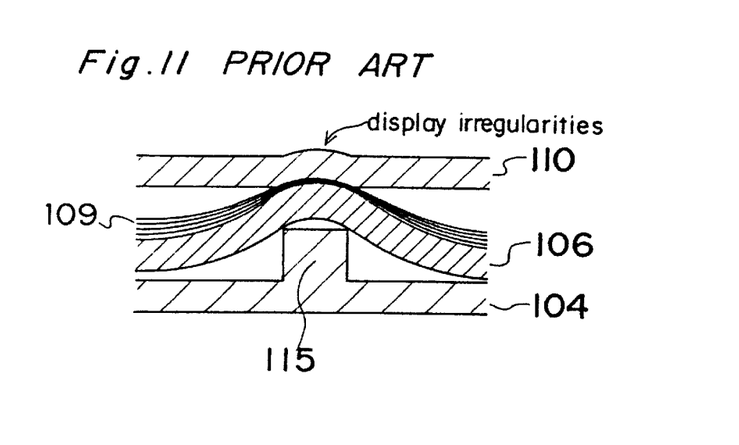
FIG. 11 is a partial cross section of a conventional liquid crystal panel module.

FIG. 10 is a view of the plastic frame 104 in the above-described liquid crystal panel module 102. As shown in FIG. 10, the plastic frame 104 is manufactured with a uniform thickness except for the lamp housing, both to reliably secure components therein, and to ensure sufficient strength in the liquid crystal panel module 102. The thickness of this plastic frame 104 is a first factor limiting thinner liquid crystal panel modules 102.

While making the LCD device 100 thinner, it is still essential to ensure a certain minimum strength. The strength of the LCD device 100, however, is more dependent on the strength of the frame than on the strength of the liquid crystal panel module 102.

This suggests that the liquid crystal panel module 102 could be made thinner by making the plastic frame 104 thinner, thus solving the first problem noted above. Doing so, however, creates a further problem, specifically, reliably securing the TFT LC panel unit 110 to the backlight unit 105 becomes difficult.

Circuits and wiring harnesses for the gate and control signal buses used for controlling the operation of the TFT LC panel unit 110 are also disposed between the plastic frame 104 and light guide 106. A plurality of protrusions are also provided on the top of the plastic frame 104 for supporting the light guide 106.

When the gap between the plastic frame 104 and light guide 106 is narrowed by an external force applied to the plastic frame 104, the light guide 106 is pushed up by one or more protrusions 115 on the plastic frame 104. This causes the light guide 106 to push up on the film 109 and thereby on the TFT LC panel unit 110. This results in display irregularities on the screen of the TFT LC panel unit 110.

To prevent such display irregularities from appearing on the screen of the TFT LC panel unit 110 in a typical liquid crystal panel module 102 as described above, a certain minimum gap is typically maintained between the plastic frame 104 and light guide 106. In addition, this gap also normally has sufficient extra tolerance, and is the second major factor limiting further reduction in the thickness of liquid crystal panel module 102.

It would also seem that the liquid crystal panel module 102 could be made thinner by narrowing the sufficient gap between the plastic frame 104 and light guide 106 to the same thickness as the thickest circuit and protrusion interposed to this gap. In this case, however, small vibrations induced by operating the keyboard, opening and closing the cover, and other operations can cause the circuit and protrusion to contact the light guide 106. Display irregularities can again result easily.

Variations in manufacturing precision can also produce distortion in the light guide 106. A specific gap is therefore provided between the light guide 106 and the TFT LC panel unit 110 in a typical liquid crystal panel module 102 as described above to prevent the distorted part of the light guide 106 from pushing up from below on the TFT LC panel unit 110 and causing display irregularities as described above. This gap is a third major factor limiting further reduction in the thickness of liquid crystal panel module 102. In addition, small contaminants and foreign objects can easily penetrate this gap, resulting in black spots, luminance errors, and other display irregularities.

The liquid crystal panel module 102 can again be made thinner by narrowing this gap, but when there are distortions in the light guide 106 and these distortions are pressed against the TFT LC panel unit 110, display irregularities will still occur.

As described above, it is difficult to resolve the problems associated with the above three factors to reduce the thickness of the thinner liquid crystal panel module 102 with a construction as described above.

Figure 12:
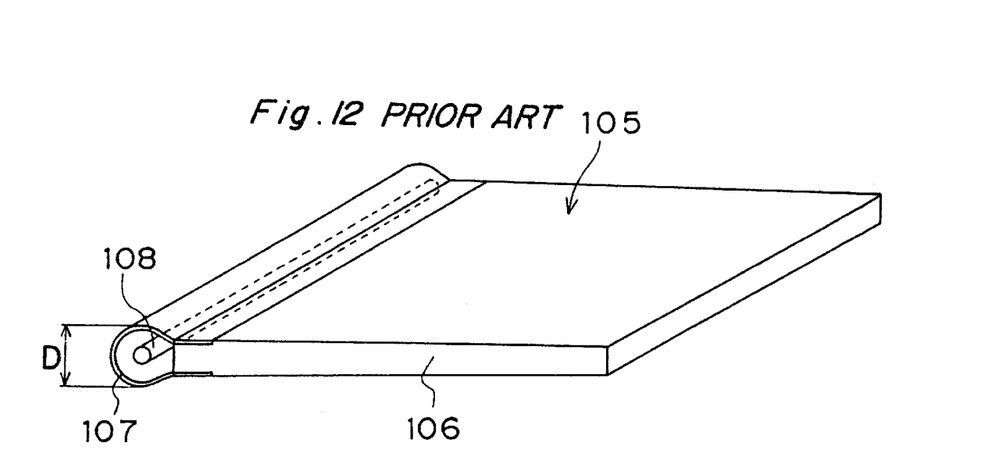
FIG. 12 is a perspective view of a backlight unit used in the LCD device shown in FIG. 9.

A further problem is related to the reflector 107 with a circular section that is used in the backlight unit 105 of a typical liquid crystal panel module 102 as shown in FIG. 12. In this case, the thickness, or more specifically the diameter D as shown in the figure, of the reflector 107 must be reduced to achieve a thinner LCD device. Reducing the diameter D of the reflector 107, however, is complicated by the following problems.

Specifically, when the reflector 107 is made thinner, the diameter of the lamp 108, which is supported on both ends inside the reflector 107, must also be reduced. Reducing the lamp 108 diameter, however, can make it more difficult to precisely position the lamp 108 inside the reflector 107 due to variations in component dimensions and applied force.

Reducing the diameter of the lamp 108 also reduces its rigidity and resistance to loads, including gravity, vibration, and impact, applied perpendicular to the longitudinal axis of the lamp. In addition, vibrations caused by typing on the keyboard can also cause the position of the lamp 108 to shift.

Figure 13:
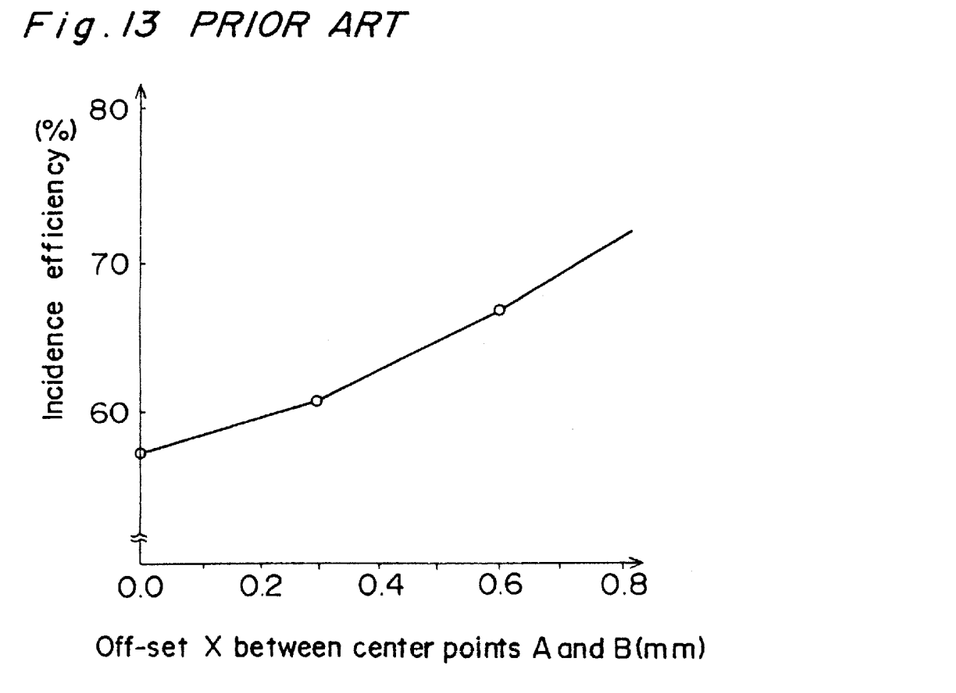
FIG. 13 is a graph of the change in incidence (%) of emitted light to the light guide when the position of the lamp changes inside the reflector.

FIG. 13 is a graph showing the relationship between the distance X from the center point A of the reflector 107 to the center point B of the lamp 108, and the incidence efficiency (%) of light from the lamp to the light guide. As will be known from FIG. 13, a slight change in the position of the lamp 108 results in a significant change in the efficiency with which a circular section reflector 107 makes the emitted light incident on the light guide 106.

As will therefore be understood, when a small diameter lamp 108 is used and the distance of the lamp 108 from the center of the reflector 107 is different at the two ends of the lamp, light from the lamp 108 cannot be guided to the light guide 106 with uniform luminance along the entire axial length of the lamp.

Furthermore, even if the lamp 108 is positioned to the reflector 107 with a uniform distance therebetween throughout the entire length of the lamp, variations in this distance to the center of the reflector 107 in different LC panel modules can easily produce variations in the luminance of the light guided to the light guide 106 in different modules.

Yet further, even if the lamp 108 is precisely mounted in a specific position in the reflector 107, typing on the keyboard and other vibrations can cause the position of the lamp 108 to shift as described above. As also described, such slight changes in position can cause a significant change in light incidence to the light guide 106, resulting in inconsistent brightness in the TFT LC panel unit 110.

Figure 14:
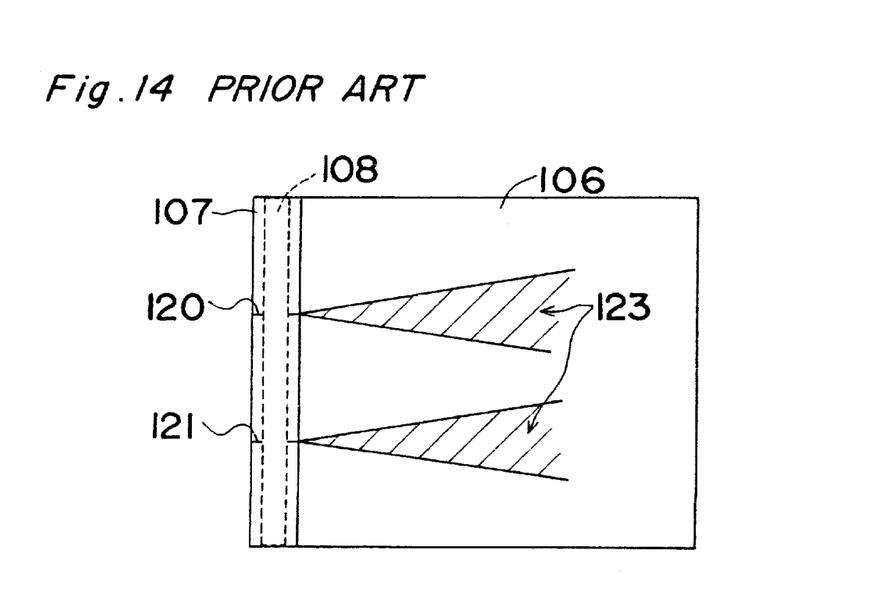
FIG. 14 is an illustration of the shadows occurring from lamp supports provided inside the reflector.

It should be noted that as the reflector 107 is made thinner, support members 120 and 121 for holding the lamp 109 inside the reflector 107 can be provided as shown in FIG. 14 as a means of fixing the position of the lamp 108 relative to the reflector 107. This, however, creates yet another problem, that is, shadows 123 appearing as indicated by the shaded areas in FIG. 14 at each support member 120 and 121.

SUMMARY OF THE INVENTION

An object of the present invention is therefore to provide a liquid crystal panel module whereby the various problems described above are addressed as a means of reducing liquid crystal display device thickness.

A further object of the invention is to provide a liquid crystal display device in which the liquid crystal panel module of the invention is used.

To meet the above described need, a liquid crystal panel module according to the present invention has a liquid crystal panel unit on a backlight unit where the backlight unit comprises a holding member for holding the liquid crystal panel unit in a specific position on the backlight unit with no gap therebetween.

The backlight unit of this liquid crystal panel module preferably comprises a light guide; a lamp for emitting illumination from one side of the light guide; and a reflector for collecting light from the lamp on the light guide. The reflector has a polygonal cross section, a thickness greater than the thickness of the light guide, and is open only the thickness of the light guide on the light guide side of the reflector.

A liquid crystal display device according to the present invention comprises a liquid crystal panel module as set forth above; a frame for housing the liquid crystal panel module; and a support for supporting the backlight unit on a surface of the support. The is further disposed between the backlight unit of the liquid crystal panel module and the frame, and has a channel for housing backlight unit components disposed on the side of the backlight unit facing the frame.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

DESCRIPTION OF THE PREFERRED EMBODIMENTS

A preferred embodiment of the present invention is described below with reference to the accompanying figures.

(1) Overall Configuration

A liquid crystal display (LCD) device according to a preferred embodiment of the present invention is described first below with reference to FIG. 1, a perspective view of a notebook computer 1 in which an LCD device 4 according to a preferred embodiment of the invention is used. As shown in the figure, this notebook computer 1 comprises a main unit 2 and an LCD device 4. The main unit 2 has a keyboard 3 on top, and a CPU, hard disk, and other components inside. The LCD device 4 comprises a liquid crystal panel module 5 according to the present is invention as described below. The LCD device 4 is connected to the main unit 2 in a manner enabling the LCD device 4 to open and close to the main unit 2.

Figure 1:
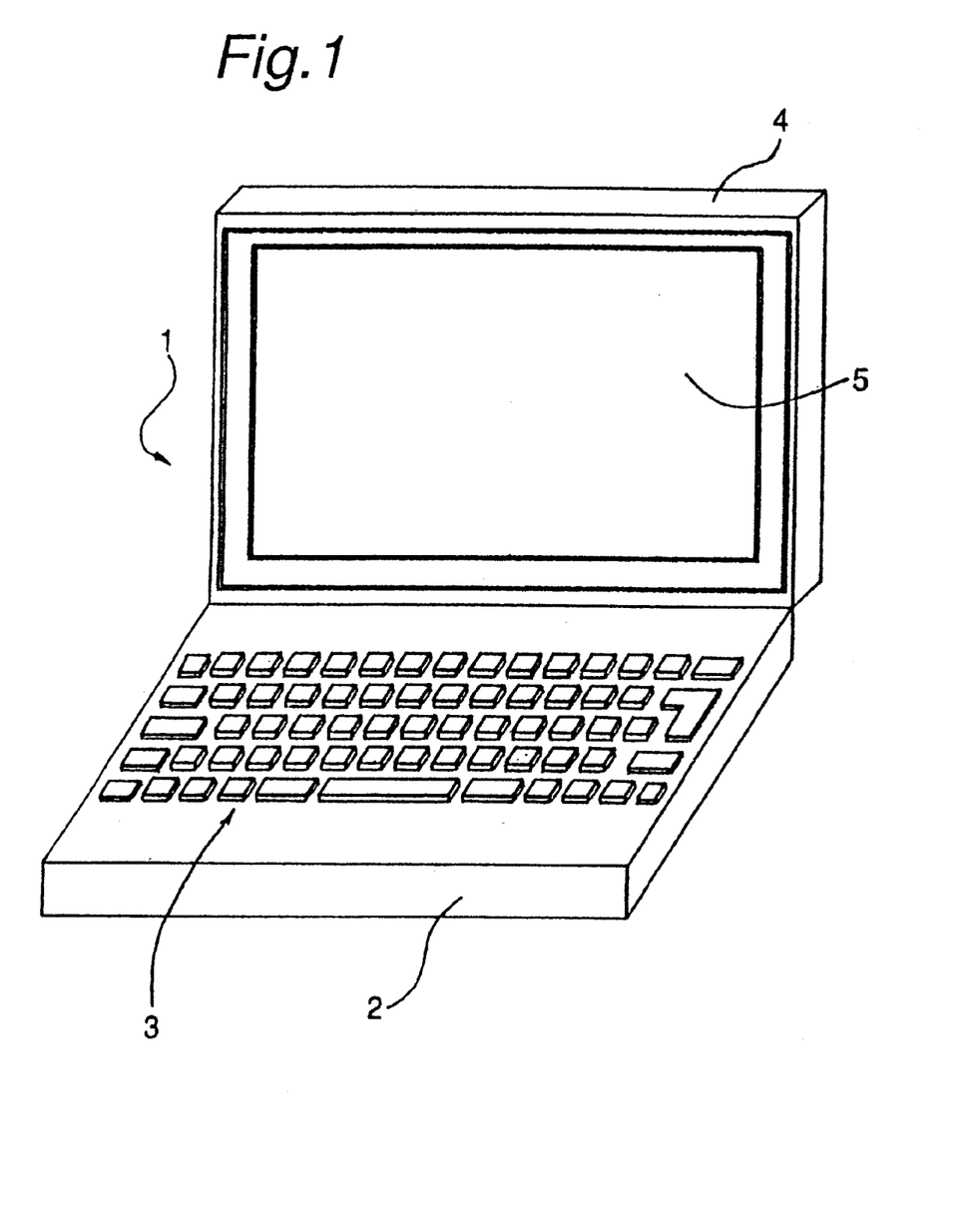
FIG. 1 is a perspective view of a notebook computer in which a liquid crystal display device according to the present invention is used.
Figure 2:
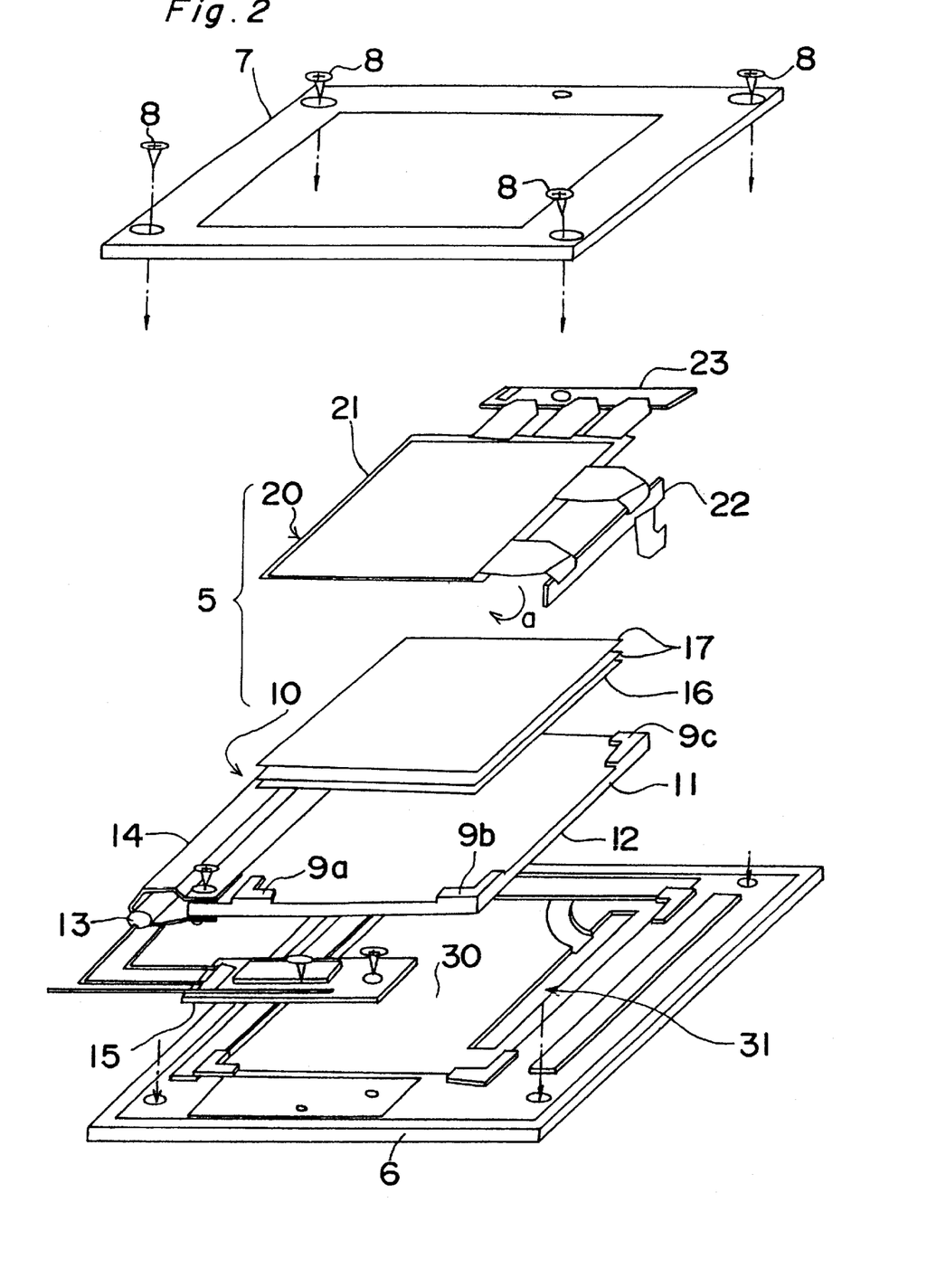
FIG. 2 is a partially exploded view of the liquid crystal display device shown in FIG. 1.

FIG. 2 is a partially exploded perspective view of the LCD device 4 shown in FIG. 1. As shown in the figure, the LCD device 4 comprises a metal frame 6, a liquid crystal panel module 5 disposed inside the frame 6, and a mask frame 7 fastened on top of the liquid crystal panel module 5 with a plurality of screws 8 screwed through from outside of the mask frame 7.

The liquid crystal panel module 5 comprises a backlight unit 10 and a liquid crystal (LC) panel unit 20.

An exemplary frame 6 in the present embodiment is die cast from magnesium (Mg) or a light alloy of magnesium.

The backlight unit 10 comprises a light guide 11 for guiding panel illumination to the LC panel unit 20, and a columnar lamp 13 disposed on one side of the light guide 11. A reflective sheet 12, typically a silver-coated resin film, is applied to the bottom surface of the light guide 11.

The lamp 13 is connected to a piezoelectric inverter transformer 15, which functions as a high frequency power supply. The lamp 13 is surrounded by a reflector 14 having a polygonal cross section that is open only on the side facing the light guide 11. The reflector 14 is typically made from a thin brass sheet with silver plating, for example, on the inside surface of the reflector 14. While described in further detail below, it is important to note here that by using a reflector 14 with a polygonal cross section as described above, the thickness of the reflector 14, which appears as the vertical thickness in FIG. 2, can be reduced as a means of reducing the thickness of the LCD device 4. When a smaller diameter lamp 13 is also used, light can still be conducted to the light guide 11 with stable, uniform luminance even when the position of the lamp 13 shifts slightly as a result of external impact or vibration.

L-shaped ribs 9a, 9b, 9c, and 9d capable of positioning the LC panel unit 20 (note that rib 9d is not shown in the figure) are disposed at each of the top four corners of the light guide 11 integrally with the light guide 11, as seen in FIG. 2. While described in further detail below, it should be noted that an optical diffusion sheet 16, lens sheet 17, and LC panel unit 20 are stacked on the light guide 11 with no gaps therebetween, and are positioned and held in a specific position with no gaps by the L-shaped ribs 9a, 9b, 9c, and 9d. Penetration of dust and other foreign matter between the LC panel unit 20 and light guide 11 can be prevented by stacking these various components on the light guide 11 with no gaps between.

It is therefore possible to reduce the thickness of the liquid crystal panel module 5 without display defects.

The LC panel unit 20 comprises a TFT liquid crystal panel 21, a source signal substrate 22, and a gate signal substrate 23, and is preferably integrally assembled by a dedicated automated assembly machine. After the LC panel unit 20 is fastened to the light guide 11, the source signal substrate 22 is preferably folded around to the back side (the bottom side in FIG. 2) of the light guide 11 as indicated by arrow a, and then secured to the frame 6.

While described in further detail below, an intermediate layer 30 is provided on the frame 6 to ensure a flat surface in contact with the light guide 11. A channel 31 in the intermediate layer 30 provides a space in which the source signal substrate 22 is held when folded around to the back of the light guide 11. The depth of this channel 31 is the same as or slightly greater than the thickness of the components disposed below the liquid crystal panel module 5, thereby preventing the components housed therein from contacting the light guide 11 as a result of external vibration or impact.

It is important to note that the intermediate layer 30 supports the light guide 11 not by discrete protrusions, but by the entire surface of the intermediate layer 30. This makes it possible to prevent localized deformation in the shape of the light guide 11 in the event that the light guide 11 is pressed against the frame 6 by an external force. By thus preventing localized deformation of the light guide 11, display irregularities can also be prevented from appearing on the screen of the TFT liquid crystal panel 21 layer above the light guide 11.

(2) Liquid Crystal Panel Module

Figure 3:
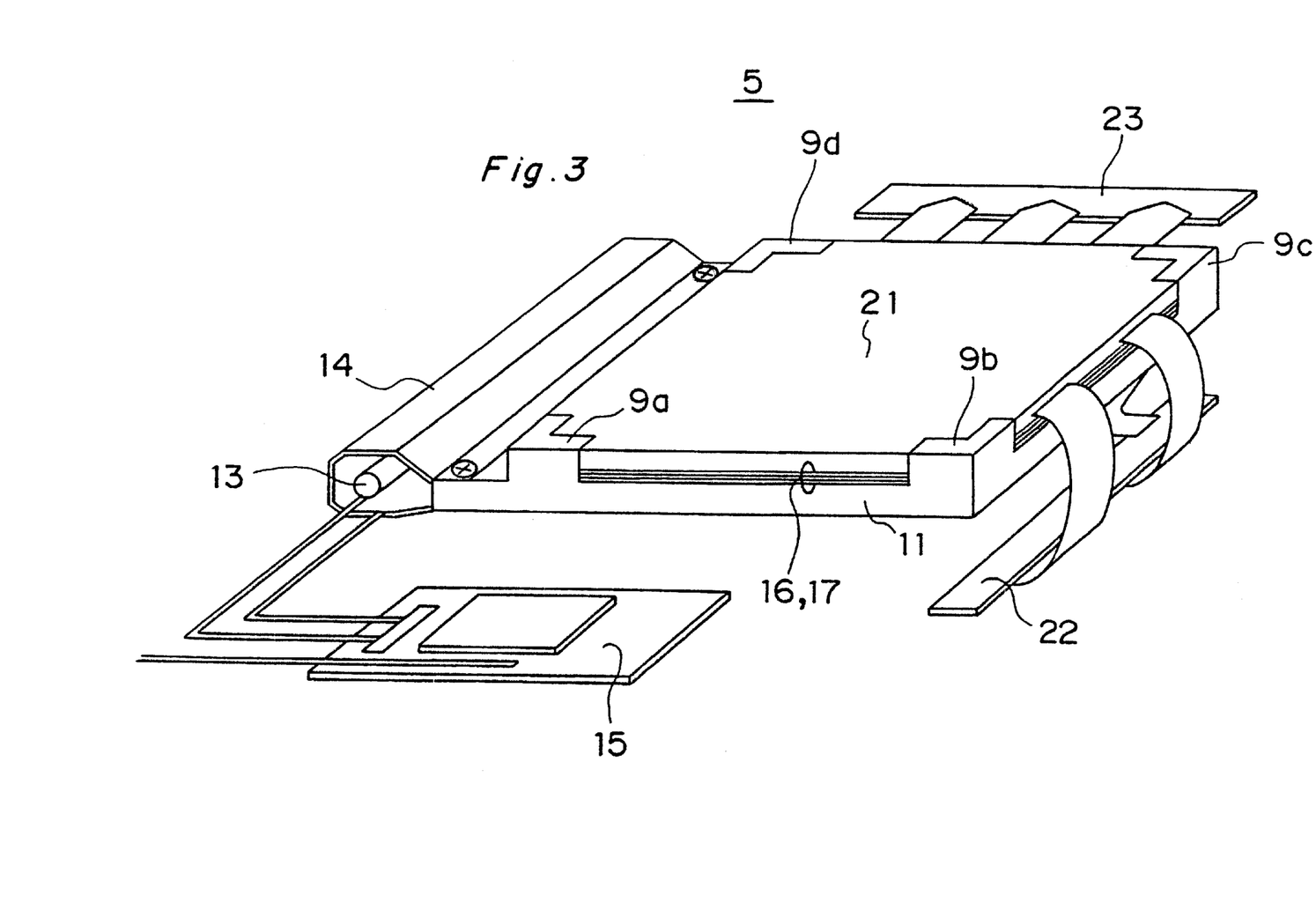
FIG. 3 is a perspective view of the liquid crystal panel module shown in FIG. 2.

FIG. 3 is a perspective view of the liquid crystal panel module 5 assembled from the backlight unit 10 and LC panel unit 20.

As shown in FIG. 9 and described above, a liquid crystal panel module exemplary of the prior art uses a plastic frame 104 having a specific uniform thickness, and metal chassis 111a and 111b to improve the mechanical strength of the liquid crystal panel module. Use of such a plastic frame 104 and metal chassis 111a and 111b is one specific factor inhibiting further reducing the thickness of the liquid crystal panel module.

As will be obvious from FIG. 3, however, the liquid crystal panel module 5 according to the present embodiment eliminates the need for such a plastic frame and metal chassis, and enables the module thickness to be reduced by placing and holding the LC panel unit 20 on the backlight unit 10 with no gap therebetween. Even more specifically, the arrangement of the present invention enables an approximately 1 mm reduction in thickness when compared with a typical conventional liquid crystal panel module comprising a plastic frame and metal chassis.

Furthermore, the thickness of the LCD device 4 can also be reduced by disposing a liquid crystal panel module 5 according to the present embodiment between the frame 6 and mask frame 7.

As noted briefly above, L-shaped ribs 9a, 9b, 9c, and 9d are disposed at respective top corners of the light guide 11, which is part of the backlight unit 10. The optical diffusion sheet 16, lens sheet 17, and LC panel unit 20 are stacked and held in a specific position, with no gaps therebetween, on the light guide 11 by the L-shaped ribs 9a, 9b, 9c, and 9d. The light guide 11 is normally made of acrylic or other similarly pliant material. As a result, an impact on the glass TFT liquid crystal panel 21 will not produce a defect where there is contact with the L-shaped ribs 9a to 9d.

It will also be obvious that inclusion of foreign matter between the component members can be prevented by eliminating any gaps between the members of the backlight unit 10.

Furthermore, disposing these various members on the light guide 11 with no gaps causes the stress of any deformation of the light guide 11 to be dispersed across the entire surface of the TFT liquid crystal panel 21. The occurrence of display irregularities can thus be suppressed, and a thinner liquid crystal panel module 5 can be achieved.

It will also be obvious that while four L-shaped ribs 9a, 9b, 9c, and 9d are described above, the number and shape of these ribs shall not be so limited insofar as the optical diffusion sheet 16, lens sheet 17, and LC panel unit 20 can be reliably positioned and held thereby on the light guide 11. More specifically, three or fewer, or five or more, ribs can be used, and a shape other than an L-shape can be used.

(3) Intermediate Layer

Figure 4:
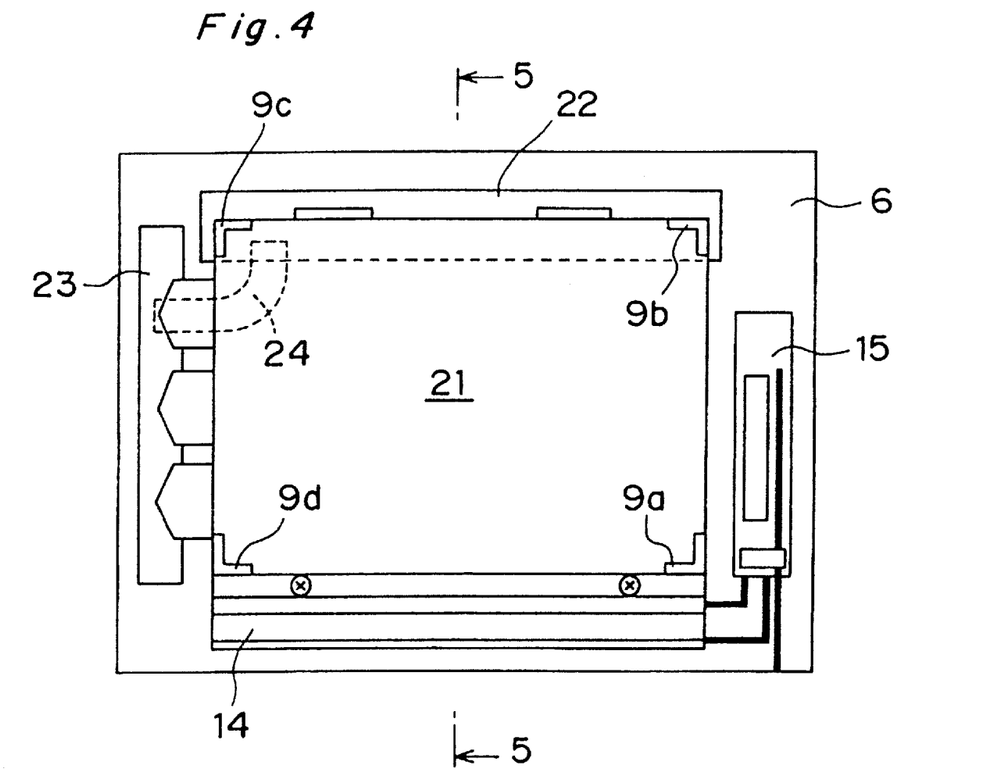
FIG. 4 is a plan view of the liquid crystal panel module housed in the frame shown in FIG. 2.

FIG. 4 is a plan view of the liquid crystal panel module 5 shown in FIG. 3 on the frame 6 shown in FIG. 2.

As shown in FIG. 3 and described above, the liquid crystal panel module 5 is placed on the frame 6 with the source signal substrate 22 folded and positioned under the liquid crystal panel module 5. A flexible printed circuit 24 leading from the source signal substrate 22 is also passed below the liquid crystal panel module 5 for connection to the gate signal substrate 23.

When the frame 6 is flat, the source signal substrate 22 and flexible printed circuit 24 arranged below the panel module 5 can push up on the TFT liquid crystal panel 21, causing display irregularities on the screen of the panel. These problems are avoided in a LCD device 4 according to the present embodiment by providing an intermediate layer 30 between the liquid crystal panel module 5 and frame 6 as shown in FIG. 2. As described above, this intermediate layer 30 has a channel 31 corresponding to the shape of the components disposed on the back of the liquid crystal panel module 5, and provides surface support for the light guide plate 11 of the backlight unit 10.

Figure 5:
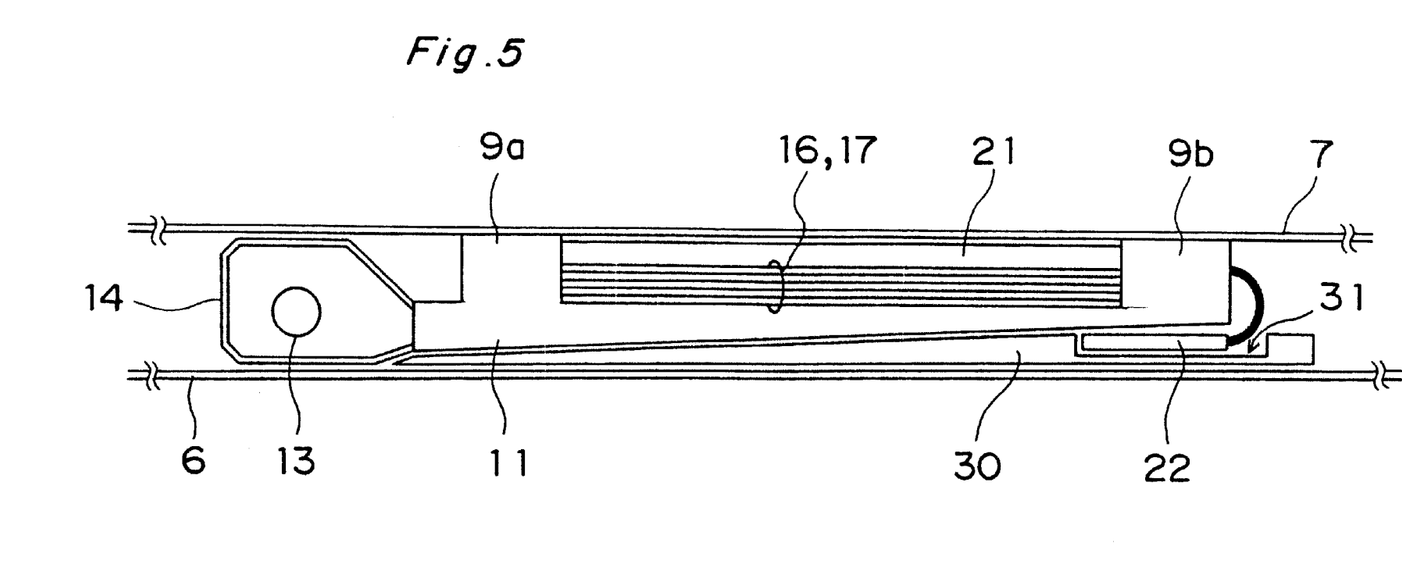
FIG. 5 is a sectional view of the liquid crystal display device shown in FIG. 4.

FIG. 5 is a cross section view through line 5—5 in FIG. 4. Note that like parts are denoted by the same reference numerals used in FIG. 2. As will be known from FIG. 5, the depth of the channel 31 provided in the intermediate layer 30 between the panel module 5 and frame 6 is substantially the same as the thickness of the source signal substrate 22 and flexible printed circuit 24. By thus providing an intermediate layer 30 with a channel 31 therein between the liquid crystal panel module 5 and frame 6, these components can be prevented from moving when external vibration or impact is applied, and can thus be prevented from pushing up on the light guide 11.

Furthermore, force applied locally to the light guide 11 can be dispersed to the entire light guide surface as a result of the intermediate layer 30 supporting the entire surface of the light guide 11. Display irregularities resulting from deflection of the light guide 11 pushing up on the TFT liquid crystal panel 21 can therefore also be effectively prevented.

While thus effectively preventing display irregularities, filling the space between the frame 6 and the back of the backlight unit 10 with this intermediate layer 30 also reduces the thickness of a LCD device 4 using the liquid crystal panel module 5 according to the present invention.

It will also be obvious that this intermediate layer 30 can be an integral part of the frame 6.

(4) Reflector

Still referring to FIG. 5, the reflector 14 used in the backlight unit 10 described above is described further below.

To achieve a thinner LCD device 4, it is necessary to reduce both the thickness of the reflector 14 and the diameter of the lamp 13. The lamp 13 is provided in the center of the reflector 14 with both ends of the lamp 13 supported. Reducing the diameter of the lamp 13 in conjunction with the thickness of the reflector 14, however, also makes it easier for variations in the positioning precision of the lamp 13 relative to the reflector 14 to occur as a result of variations in the dimensional precision of components and the force applied. As the lamp 13 diameter decreases, however, so does lamp rigidity. This makes the lamp 13 more susceptible to external vibrations and impacts of even minimal force, and the position of the lamp 13 can be easily offset from the center of the reflector 14 Light from the lamp 13 can still be introduced to the light guide 11 with stable, uniform luminance even when the position of the lamp 13 is offset, however, by using a reflector 14 having a polygonal shape in cross-section.

The ability of the polygonally shaped reflector 14 of the invention to direct light with stable luminance to the light guide 11 even when the position of the lamp 13 is offset is described further below with comparison to a typical conventional reflector having a circular shape in section.

Figure 6:
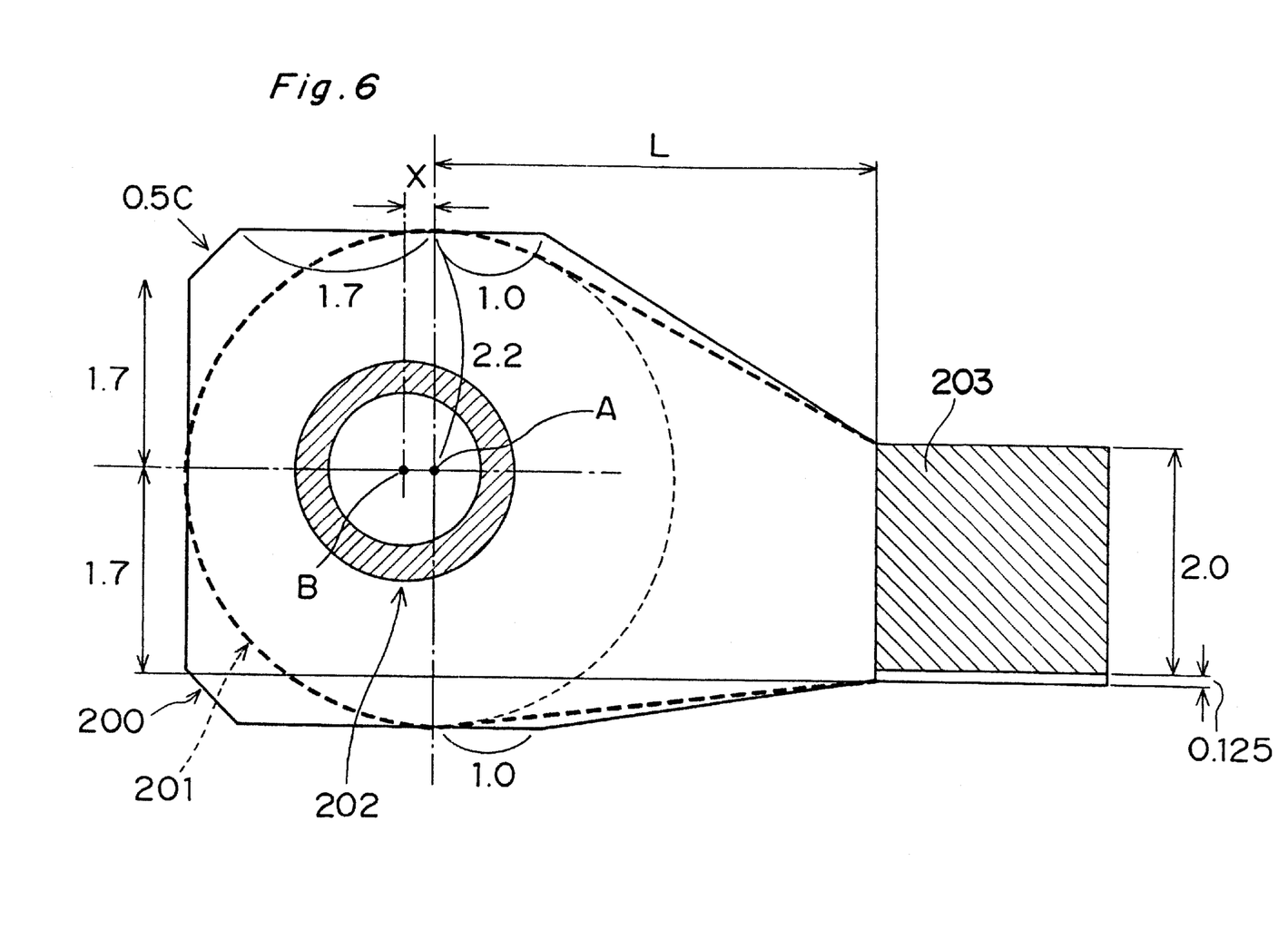
FIG. 6 is a drawing showing dimensions of two different types of reflectors for comparison.

FIG. 6 is a sectional view showing the dimensions of a reflector 200 having a polygonal cross section (polygonal reflector 200 below), and a conventional reflector 201 having a circular cross section (circular reflector 201 below). The polygonal reflector 200 is indicated by the solid lines in the figure, and the circular reflector 201 by the dotted lines. Both reflectors 200 and 201 are silver reflectors with 98% reflectance. The lamp 202 has a 2.0 mm outside diameter and a 1.4 mm inside diameter. The light guide 203 connected to each reflector is made from 2.0 mm thick acryl. A 0.125 mm thick reflective sheet is affixed to the bottom of the light guide 203.

Comparison was made by measuring the incidence (%) of light from the lamp to the light guide for each distance X at each distance L. Distance L is the distance from the edge of the light guide 203 to the center point A of each reflector. Distance X is the distance from the center point A of the reflector to center point B of the lamp. Measurements were taken with distance L set to 3.0 mm, 4.0 mm, and 5.0 mm, and distance X was set to 0 mm, 0.3 mm, and 0.6 mm at each distance L.

Figure 7:
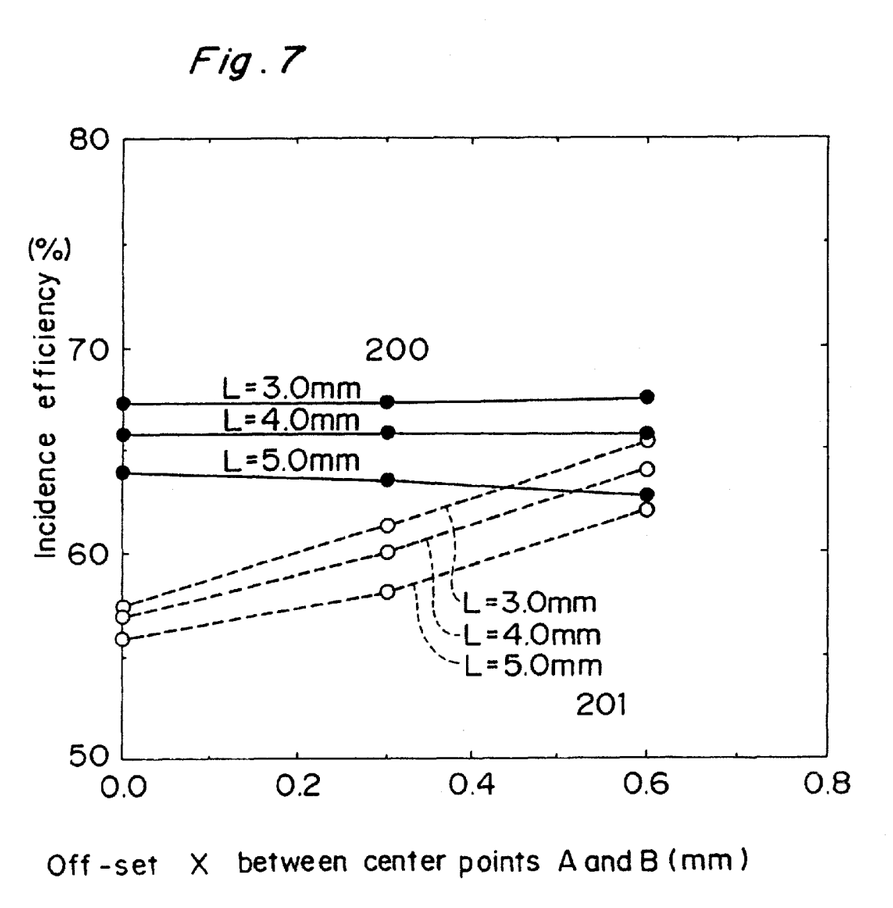
FIG. 7 is a graph used to describe the incidence (%) of light from the lamp on the light guide when the position of the lamp is changed inside the reflector.

The results of the above measurements are shown in the graph of FIG. 7. Incidence efficiency (%) is shown on the vertical axis, and distance X between the lamp and reflector centers is shown on the horizontal axis. The plotted points are shown for distances L of 3.0, 4.0, and 5.0 mm as described above. The results obtained with the polygonal reflector 200 are drawn by solid lines, and the results for the circular reflector 201 are shown by the dotted lines.

As will be known by comparing the graphed results, the change in incidence (%) resulting from a change in the position of the lamp 202 is less with a polygonal reflector 200 than with a circular reflector 201. The reasons for this are described below.

Light loss inside the reflector 200 or 201 results primarily from the absorption of light reflected by the reflector 200 or 201 by the fluorescent tube used for the lamp 202. As a result, the amount of light incident on the light guide 203 increases as the amount of light incident on the lamp 202 decreases. The probability of light emitted from the lamp 202 being reflected to and incident on the lamp 202 was compared using a polygonal reflector 200 and a circular reflector 201. It was found that while there is a significant change in this probability when the lamp 202 is and is not positioned at center point A with a circular reflector 201, there is little change in the probability of reflected light hitting the lamp in a polygonal reflector 200 regardless of where the lamp 202 is positioned. This is because there is a specific point (specifically, the point at which distance X between lamp center B and circular reflector 201 center A is 0) at which there is a sudden increase in the surface area where light from the lamp 202 is perpendicular to a circular reflector 201, and a polygonal reflector 200 has no such specific point. In order to avoid generating such a specific point, it seems effective for the polygon forming the cross section of reflector 14 to have at least one side longer than the diameter of the lamp 13.

As a result, a change in the position of the lamp 202 in a polygonal reflector 200 causes less change in incidence (%) on the light guide 203 than does the same change in a circular reflector 201.

It will therefore be obvious that a reflector 14 identical to the polygonal reflector 200 shown in FIG. 6 achieves the following three benefits.

(1) Light with uniform luminance in the axial direction of the lamp 13 can be guided to the light guide 11 even when the distance to the center of the reflector 14 differs at each end of the lamp 13. This distance difference can occur, for example, as a result of variations in the mounting precision of the lamp 13.

(2) Consistently uniform luminance light with no variation between liquid crystal panel modules can be guided to the light guide 11. This is possible even when both ends of the lamp 13 are equidistant to the center of the reflector 14, but this distance is different in different liquid crystal panel modules.

(3) Stable luminance light can be guided to the light guide 11 even when the position of the lamp 13 becomes shifted after assembly, as a result of external shock.

Figure 8:
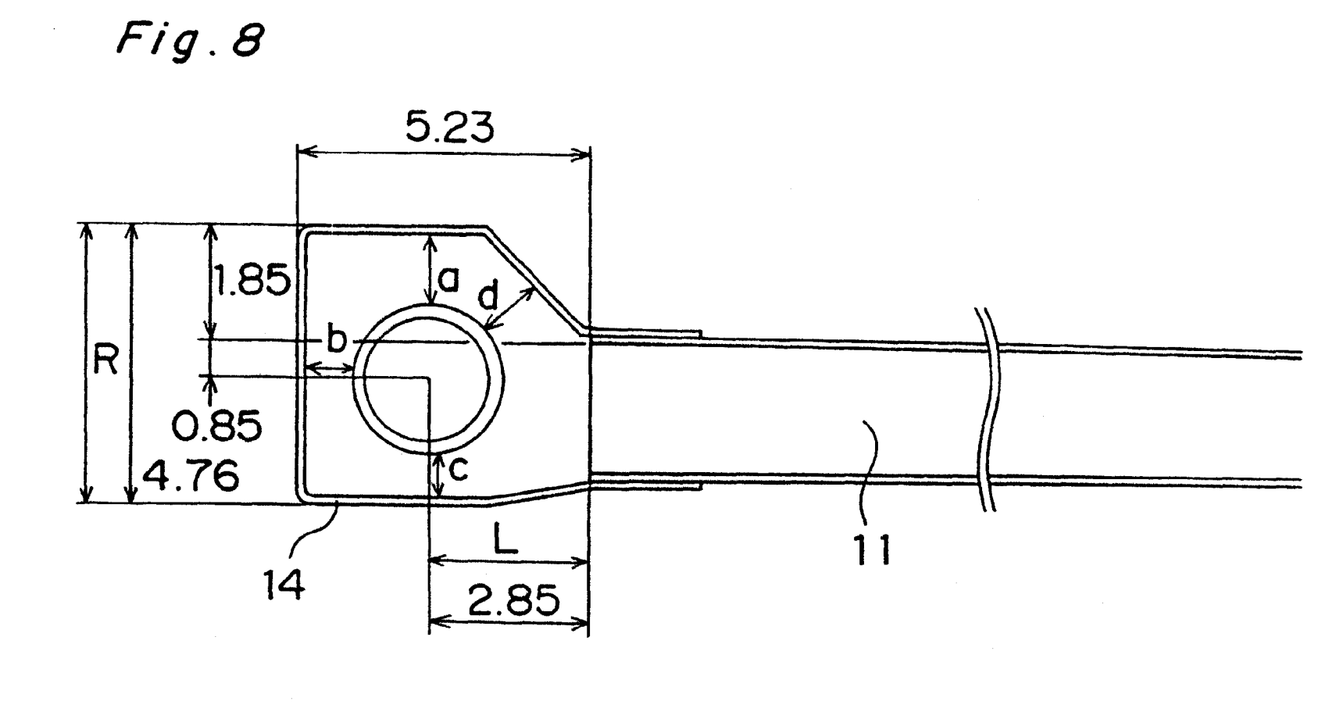
FIG. 8 shows actual dimensions of a reflector according to the present invention.

FIG. 8 is a sectional view of a reflector 14 with specific dimensions shown by way of example. Note that all values are expressed in millimeters. In the present preferred embodiment, a light guide 11 with thickness f=2.1 mm, and a lamp 13 with a 2.0 mm diameter, are used. The reflector 14 thickness R is 4.76 mm, and distance L from the reflector center to the light guide 11 is 2.85 mm. Distances a to d from the lamp 13 to the nearest surface of the reflector 14 are all approximately 1.0 mm.

Factors to be considered in determining the various dimensions of the reflector 14 above are described below.

In general, the shorter the distances a to d from the lamp 13 to the nearest surface of the reflector 14, the better the incidence on the light guide 11. As described below, however, this distance must also be a distance at which high frequency leakage does not occur, and heat loss can be suppressed.

A compact, high efficiency piezoelectric inverter transformer is driven at a high frequency, typically approximately 100 kHz. High frequency leaks occur more easily as the operating frequency of the piezoelectric inverter transformer used as the power supply for the fluorescent lamp 13 increases. High frequency leaks produce an uneven luminance distribution in the axial direction of the lamp 13, and thus prevent uniform illumination of the TFT liquid crystal panel 21. As the distance a to d from the lamp 13 to the nearest surface of the reflector 14 increases, however, electrostatic capacitance decreases, and high frequency leaks can be effectively prevented. For example, when the lamp 13 diameter is 1.6 to 2.0 mm, and a piezoelectric inverter transformer with a 100-kHz operating frequency is used, high frequency leaks can be prevented by using distances a to d of 0.8 mm or greater.

Heat loss as referred to above refers to using the reflector 14 as a heat sink to dissipate as much heat as required to maintain the lamp temperature at or within a specific temperature range (generally approximately 80° C.). This heat loss occurs through the thermal conductivity of air, and tends to increase as distances a to d decreases.

Lamp emission efficiency also tends to improve as the lamp diameter increases. A larger lamp diameter is also preferable as a means of assuring sufficient rigidity and strength to withstand external forces. For example, typical lamps 13 presently available require a tube diameter of approximately 1.5 mm or greater due to mechanical reliability concerns. To suppress high frequency leaks and keep heat loss within a specific maximum level, the thickness of the reflector 14 (inside dimension) is preferably the lamp diameter plus approximately 2.0 mm or greater.

To improve incidence efficiency (%), the thickness of the light guide must be approximately equal to or greater than the lamp diameter, and is therefore preferably 1.5 mm to 2.5 mm. The combined thickness of the optical diffusion sheet and lens sheet is approximately 0.4 to 0.6 mm, and the liquid crystal panel thickness is approximately 1.0 to 1.4 mm. The thickness of the reflector 14 is therefore specified as 3.5 mm to 4.5 mm.

When high frequency leaks and heat loss cannot be effectively reduced at the combined thickness of the filters 16 and 17 and TFT liquid crystal panel 21 on the light guide 11 due to the relationship to the lamp diameter, the thickness of the reflector 14 is preferably the minimum thickness required to achieve distances a to d at which high frequency leaks do not occur, and heat loss can be kept within a specific maximum level.

As will also be known from the graph in FIG. 7, incidence increases as the distance L from the center of the reflector 14 to the light guide 11 decreases. However, if this distance L is too short, the distance d from the lamp 13 to the nearest reflector surface will be too short. In this case, high frequency leaks and heat loss increase, and performance actually drops.

In the case of a reflector 14 as shown in FIG. 8, for example, distance L is preferably between approximately 2.0 mm and 3.0 mm.

It will be obvious that while the reflector 14 in the preferred embodiment described above has an approximately hexagonal shape, the reflector of the present invention shall not be limited thereto. More specifically, various other configurations can be used insofar as the cross section is polygonal, and a shift in the position of the lamp 13 results in little change in the surface area on which light emitted from the lamp 13 is perpendicularly incident.

As will be known from the above description of a preferred embodiment of the invention, a liquid crystal panel module according to a first version of the invention eliminates the plastic frame used in conventional liquid crystal panel modules, and secures the liquid crystal panel unit directly on the backlight unit with no gap therebetween by means of an intermediate layer. As a result, the number of parts is reduced, and the liquid crystal panel module can be made thinner than conventional liquid crystal panel modules.

A liquid crystal panel module according to a second version of the invention likewise eliminates the plastic frame used in conventional liquid crystal panel modules, and can therefore be made thinner than a conventional liquid crystal panel module, In addition, the liquid crystal panel module of the present invention uses a reflector which when viewed in section has a polygonal shape. As a result, light emitted from the lamp can be guided with uniform, stable luminance to the light guide even when the position of the lamp is shifted by vibration, manufacturing imprecision, or other factor. It is therefore also possible to use a small diameter lamp with relatively low vibration resistance, and thereby make the liquid crystal panel module even thinner.

A liquid crystal display device according to the present invention houses circuits and other components disposed on the back side of a liquid crystal panel module according to either the first or second version described above in a recess in the intermediate layer. As a result, these circuits and other components can be effectively prevented from pushing up on the liquid crystal panel module and causing display irregularities on the screen as a result of vibration or other external force. By interposing an intermediate layer as described above to provide surface support for the liquid crystal panel module, force applied locally to the liquid crystal panel module can be dispersed through the entire panel, and the occurrence of display irregularities resulting from such external force can be reduced.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A liquid crystal display device comprising:

a liquid crystal panel unit;

a backlight unit for illuminating the liquid crystal panel unit from a back side of the liquid crystal panel unit, said backlight unit including a light guide plate having
      a front surface supporting said liquid crystal panel unit and including protruding ribs for positioning said liquid crystal panel unit on said light guide plate, said ribs being located at corners of said light guide plate, each rib having an "L" shape on the front surface of said light guide plate,
      a thickness, and
      a planar rear side; and a box-like frame in which said liquid crystal panel unit and said backlight unit are held.

2. The liquid crystal display device as set forth in claim 1, wherein said backlight unit further comprises:

a light source of linear configuration located at one side of said light guide plate; and a reflector having a polygonal cross section and arranged parallel to said linear light source, said reflector having at least one planar surface opposite a planar surface of said light guide plate, reflecting light emitted from said linear light source and collecting reflected light from said planar surface of said light guide plate, wherein said reflector has a width, in a direction opposite upper and lower plates of said box-like frame, larger than the thickness of said light guide plate and smaller than the thickness of said liquid crystal display device.

3. The liquid crystal display device as set forth in claim 1, wherein said box-like frame comprises upper and lower frames.

4. The liquid crystal display device as set forth in claim 1, including a space between said backlight unit and a bottom of said frame housing elements for driving said liquid crystal panel, and supporting said backlight unit.

5. A liquid crystal panel device comprising:

a liquid crystal panel unit having a generally rectangular configuration with four angled corners;

a backlight unit for illuminating the liquid crystal panel unit from a back side of the liquid crystal panel unit, said liquid crystal panel unit being mounted on said backlight unit in a face-to-face relationship, said backlight unit including
      a light guide plate having first and second side faces opposite each other, said light guide plate having a generally rectangular configuration with four angled corners;
      a lamp disposed adjacent the first side face of said light guide plate for emitting illuminating light into said light guide plate towards the second side face of said light guide plate, and
      a reflector partially enclosing said lamp for reflecting a portion of the illuminating light emitted from said lamp in a direction generally opposite the first side face of said light guide plate and guiding reflected illuminating light into said light guide plate, the illuminating light traveling within said light guide plate, illuminating said liquid crystal panel unit from the back side, said liquid crystal panel unit panel unit and said backlight unit being combined in an assembly, and a box-like metal frame accommodating said assembly of said liquid crystal panel unit and said backlight unit, said frame including
      a plurality of first ribs fixedly mounted on said frame, holding said assembly immovable in a direction parallel to said liquid crystal panel unit and said light guide plate, said first ribs being generally L-shaped and arranged at respective locations aligned with respective corners of said assembly, in abutment with respective corners of said assembly, and
      a plurality of second ribs fixedly mounted on said light guide plate at respective locations spaced from said liquid crystal panel unit and holding said liquid crystal panel unit immovable in a direction parallel to said liquid crystal panel unit, said second ribs being generally L-shaped and fixedly mounted on respective corners of said light guide plate, in alignment with respective corners of said liquid crystal panel unit, the corners of said liquid crystal panel unit being in abutment with respective second ribs.

6. The liquid crystal panel device as claimed in claim 5 further comprising an intermediate member having a bumpless flat surface supporting said assembly with said light guide plate in contact with said intermediate member on a side remote from said liquid crystal panel unit.

* * * * *